United States Patent [19]
Nakatani

[11] 4,362,307
[45] Dec. 7, 1982

[54] SHOULDER-CARRIABLE CART

[75] Inventor: Koma Nakatani, Tokyo, Japan

[73] Assignee: Nihon Velbon Seiki Kogyo Kabushiki Kaisha, Tokyo, Japan

[21] Appl. No.: 186,184

[22] Filed: Sep. 11, 1980

[30] Foreign Application Priority Data

Nov. 9, 1979 [JP] Japan .................................. 54-156390

[51] Int. Cl.³ ........................ B62B 1/04; A47D 13/02
[52] U.S. Cl. ...................................... 280/30; 224/153; 280/40
[58] Field of Search ........................ 280/30, 39, 40, 42; 224/151, 153, 154, 155, 156; 403/93, 94, 96

[56] References Cited

U.S. PATENT DOCUMENTS

| 2,401,986 | 6/1946 | Talbott | 224/153 |
| 3,043,603 | 7/1962 | Major, Sr. | 280/40 |
| 3,292,830 | 12/1966 | Mack | 224/155 |
| 4,128,252 | 12/1978 | Raniero | 280/40 |
| 4,157,837 | 6/1979 | Kao | 224/155 |

FOREIGN PATENT DOCUMENTS 1194851  6/1970  United Kingdom ................ 224/155

*Primary Examiner*—Joseph F. Peters, Jr.
*Assistant Examiner*—Donn McGieghan
*Attorney, Agent, or Firm*—McCormick, Paulding & Huber

[57] ABSTRACT

A shoulder-carriable cart comprising: a frame; a pair of wheel supports fitted over the frame in such a manner that they can either be rotated or held immovable; wheels, each mounted to and projecting from one side of the wheel support; pins projecting from the frame; and grooves formed in the wheel supports to receive the pins to hold the wheels immovable. A buckle through which a waist belt is inserted is provided to each wheel support on the side opposite to that where the wheel is mounted.

10 Claims, 8 Drawing Figures

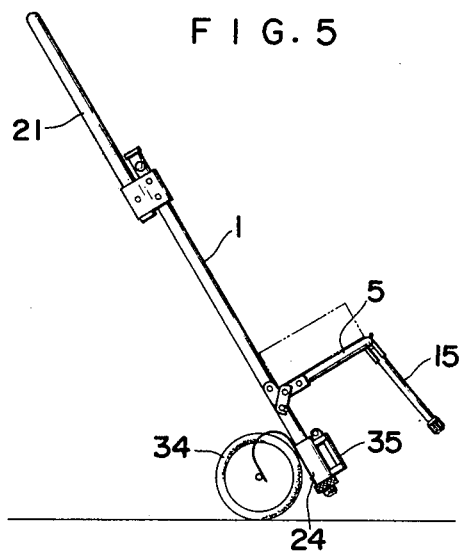
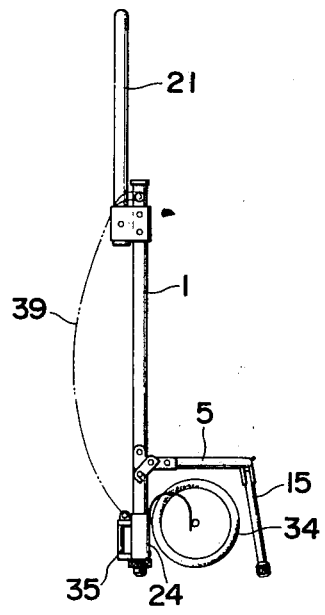
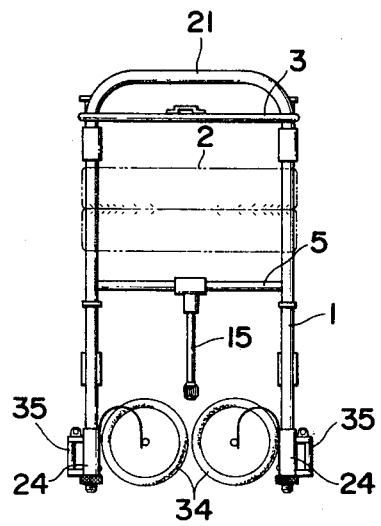

SHOULDER-CARRIABLE CART

BACKGROUND OF THE INVENTION

1. Field of the Invention

This invention relates to a shoulder-carriable cart and more particularly to the construction of the wheels mounted on the cart.

2. Description of the Prior Art

In the conventional shoulder-carriable cart, the wheels are provided immediately below the frame so that the wheels do not bear against the body of human carrier when it is carried on his back. When it is used as a cart, the cart frame is tilted forward causing the center of gravity to move forward away from the wheel. As a result, the wheels become heavy. In order to remove this shortcoming, an improvement has been made over such conventional cart, in which the wheels hinged to the frame can be turned toward the front when it is used as a cart and is turned sideways when carried on one's back. However, this kind of cart has its wheels projected sideways when carried on one's back, and these projected wheels become a hindrance when one walks a narrow passage.

SUMMARY OF THE INVENTION

This invention has been accomplished to provide a shoulder-carriable cart which can overcome the above drawback and which comprises: a frame consisting of a pair of pipes; a wheel support fitted over the lower portion of each pipe of the frame in such a manner that the wheel support can either be rotated or held immovable; a wheel secured to and projected from one side of each wheel support; pins projecting from the frame; and grooves formed in the wheel supports to receive the pins to hold the wheels immovable either on the front side of the frame, on the back side, or between the pair of pipes of the frame; whereby the wheels are set either on the front side of the frame, or on the back side, or between the pair of pipes of the frame, depending on whether the shoulder-carriable cart is used as a cart, or carried on one's back, or is folded, respectively.

The shoulder-carriable cart of this invention with the above construction provides the following advantages.

First, when the device is to be carried on one's back, the wheels are turned to the back side of the frame and is secured to the frame so that the wheels do not project in front and bear against the body of a human carrier. Furthermore, since the wheels project backward with respect to the human body, they do not pose any hindrance in walking narrow passages as they would when turned to project sideways.

Second, when the device is to be used as a cart, the wheels are turned on the axes of the frame to project on the front side of the frame. Hence when the cart is tilted forward, the wheels assume the position below the center of gravity. This ensures stable running of the cart.

Third, when not in use, the cart can be folded into a flat, small shape by turning the wheels to the position between the pair of pipes of the frame.

BRIEF DESCRIPTION OF THE DRAWINGS

FIGS. 4 and 5 are side views of the cart in operation;

FIG. 6 is a front view of the cart in a folded condition;

DETAILED DESCRIPTION OF THE PREFERRED EMBODIMENT

Figure 1:
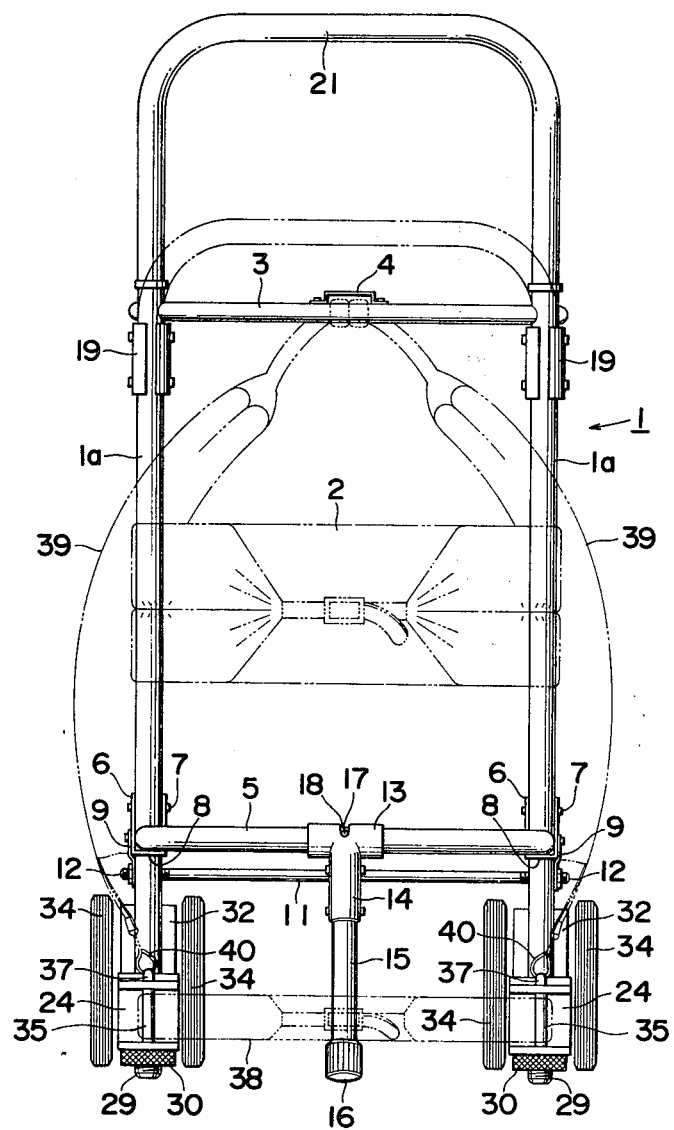
FIG. 1 is a front view of a shoulder-carriable cart of one embodiment of this invention.

A frame 1 consisting of a pair of metal pipes 1a has a back strap 2 of a cushioning material detachably stretched across the pair of pipes 1a at their intermediate portions. The pair of pipes 1a are interconnected at the upper ends by a connecting pipe 3, which has a shoulder strap holder 4 at the center. Projecting toward the back side of the cart from the lower portion of the frame 1 is a shelf 5 of U-shaped metal pipe, to the base of which one end of an L-shaped fitting 6 is secured by a screw. The shelf 5 is supported by the pipes 1a for movement between extended and retracted positions, respectively indicated by full and broken lines in FIG. 2. The other end of the L-shaped fitting 6 is rotatably supported on the frame 1 by a pin 7. The underside 8 of the L-shaped fitting 6, which is bent perpendicular to its side, supports the undersurface of the shelf pipe 5. One end of a hook arm 9 is attached by a screw to the horizontal side of the L-shaped fitting 6 extending along the shelf pipe 5. At the other end, the hook arm has a hook portion 10 which is engaged with a projection 12 of a head of a connecting bolt 11 spanning across the pipes 1a of the frame 1. The hook arm 9 serves to releasably retain the shelf 5 in its extended position. Rotatably mounted on the central portion of the U-shaped shelf pipe 5 is a T-shaped fitting 13 made of pipe. An upper end of a leg 15 is inserted into the downwardly projecting portion 14 of the T-shaped fitting 13, with the connected portion fixed by a screw. The leg 15 has a friction member 16 at the lower end to prevent slipping. A pin 17 projecting from the shelf pipe 5 is received into a slot 18 formed in the T-shaped fitting 13 so that the leg 15 will not rotate counterclockwise as viewed in FIG. 2. Fitted to the upper portion of each pipe 1a is a cylindrical connector 19 with an axial gap, which is fixed to the pipe 1a by screws. The connector 19 has a connecting cylindrical portion 20 which runs parallel to it. An extension metal pipe 21 of an inverse U shape, which extends parallel to the metal pipes 1a, has its lower ends inserted into the connecting cylindrical portions 20. The hole 22 formed near the lower end of the extension pipe 21 is aligned with a hole of the connecting cylindrical portion 20 with a pin 23 inserted through these holes to support the extension pipe 21.

Figure 3:
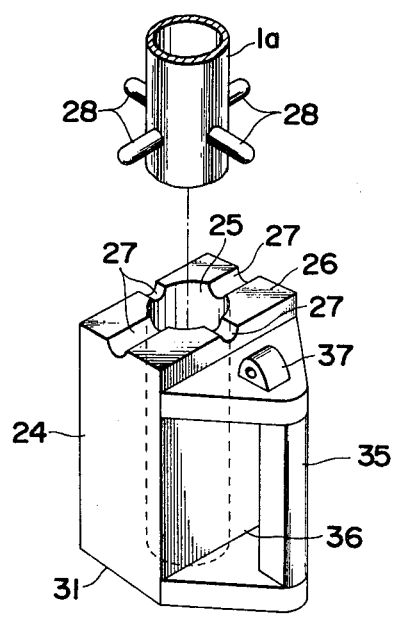
FIG. 3 is a perspective view of a wheel support of the cart.

A wheel support 24 is fitted over the lower end of each of pipes 1a. The wheel support 24 is formed of a rectangular pillar, as shown in FIG. 3, and has an axially extending through-hole 25 formed at the center through which a pipe 1a is inserted. Grooves 27 are cut into the upper rectangular surface 26 of the wheel support 24 in such a way that they extend crosswise from the center through-hole 25 toward the four sides of the surface 26. At the lower end of the pipe 1a of the frame, pins 28 project outwardly 90 or 180 degrees apart from each other and fit into the grooves 27. A nut 30 is screwed over the threaded portion 29 at the lower end of the pipe 1a, and this nuts 30 is turned to push up the underside 31 of the wheel support 24 and thereby press the grooves 27 against the pins 28 so that the wheel support 24 does not rotate on the pipe 1a.

A wheel mounting plate 32 of an elastic metal plate, which is curved into an inverse U shape, is secured at one end to one side of the wheel support 24 by a screw. Fitted to the other end of the wheel mounting plate 32 is a wheel shaft 33 on which wheels 34 are mounted and which extends horizontally and parallelly to the wheel mounting plate 32. The lower end of each wheel 34 is slightly higher than the lower end of the frame 1.

On the side opposite to that where the wheels 34 are mounted, the wheel support 24 has a buckle 35 which forms a slot 36 through which a waist belt 38 is inserted. The wheel support also has a projection 37 on the upper side of the buckle 35, to which the lower end of a shoulder strap 39 is attached.

The waist belt 38 is stretched across the two buckles 35, and the shoulder straps 39 whose upper ends are attached to the holder 4 are secured at the lower ends 40 to the projections 37.

Next, how the shoulder-carriable cart is used will be described in the following.

When it is carried on one's back, the wheels 34 are turned to the back side of the frame 1, as shown in FIG. 4. Before turning the wheels 34 to the back side, the nut 30 is loosened to disengage the pins 28 from the grooves 27. Then the wheel supports 24 are turned 180 degrees about the frame 1 with the waist belt 38 attached to the buckles 35. With the wheel supports turned 180 degrees, the pins 28 are again brought into engagement with the grooves 27 and fastened by the nut 30. By this procedure, the wheels 34 are disposed on the back side of the frame 1, and the buckles 35 are projected to the front side with the waist belt 38 stretched between the buckles 35. At the same time, fittings 40 to which the lower ends of the shoulder straps 39 are attached are also advanced to the front side. Since the buckles 35 project on the front side more than the frame 1, the waist belt 38 also projects on the front side of the frame 1, preventing the load from hitting one's waist.

Figure 2:
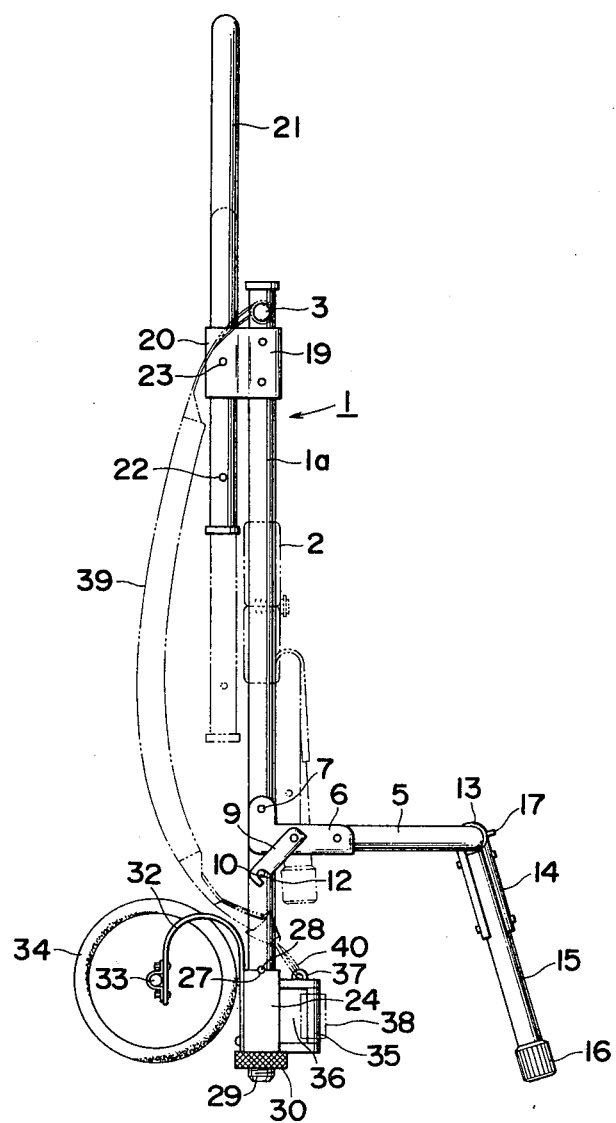
FIG. 2 is a side view of the shoulder-carriable cart as illustrated in FIG. 1.

When this device is used as a cart, the wheel supports 24 are rotated so that the wheels 34 assume the position in front of the frame 1 as shown in FIG. 2. In this case, the buckles 35 are turned to the back side of the frame 1. Thus it is not necessary to remove the waist belt 38 in rotating the wheel supports 24.

When the frame 1 is tilted, as shown in FIG. 5, the center of gravity is located above the wheels 34. In this condition the cart is pulled. In changing the direction, the chart can be turned on one pipe 1a as an axis. The wheels 34 do not interfere with the rotation of the cart because the lower ends of the wheels are slightly higher than the lower ends of the pipes 1a.

When not in use, the cart can be folded as shown in FIG. 6. The pin 23 connecting the extension pipe 21 and the connecting cylindrical portion 20 is removed to lower the extension pipe through the connecting cylindrical portion 20. Then the wheel supports 24 are loosened and turned 90 degrees from the position shown in FIG. 2 so that they are placed between the opposing pipes 1a of the frame 1. With the wheels positioned between the pipes, the wheel supports 24 are fixed by fastening the nuts 30. The leg 15 is rotated clockwise as viewed in FIG. 2 to fold it against the underside of the shelf pipe 5, which is then rotated counterclockwise, by releasing the hook arm 9 from the projection 12, until it stands upright and parallel to the frame 1. In this way, the cart of this invention can be folded into a small, flat shape.

Figure 7:
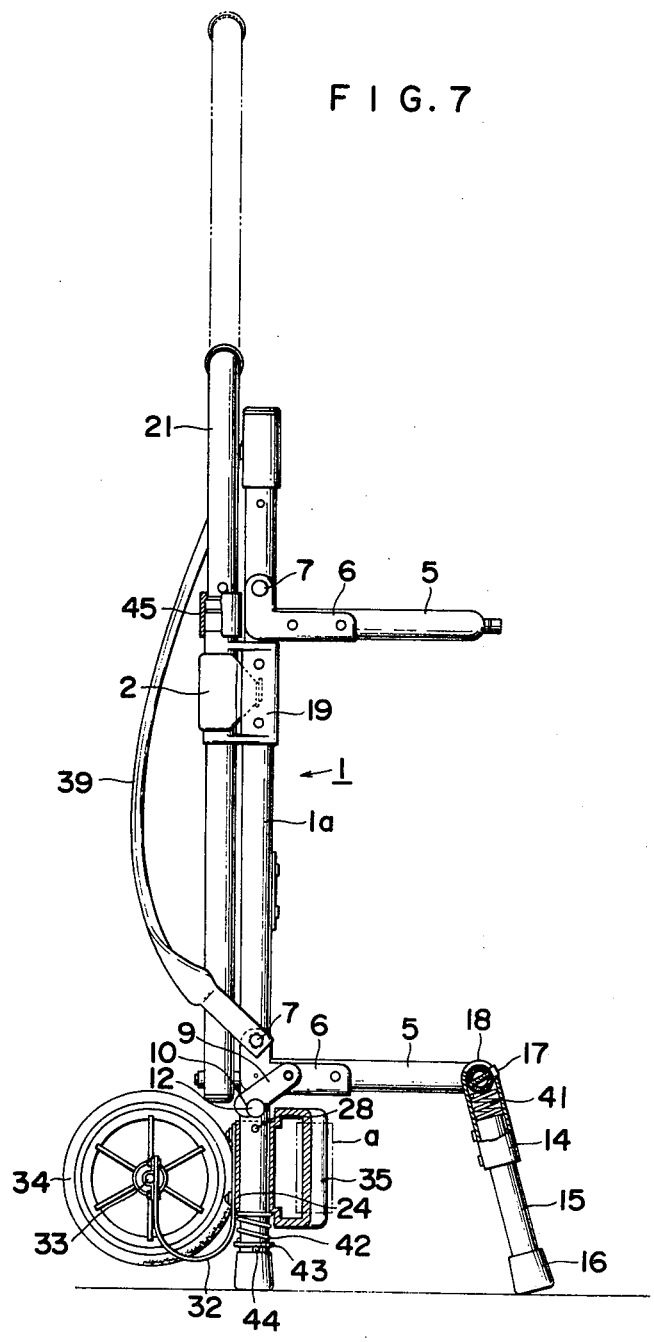
FIG. 7 is a side view of a shoulder-carriable cart of another embodiment of this invention.
Figure 8:
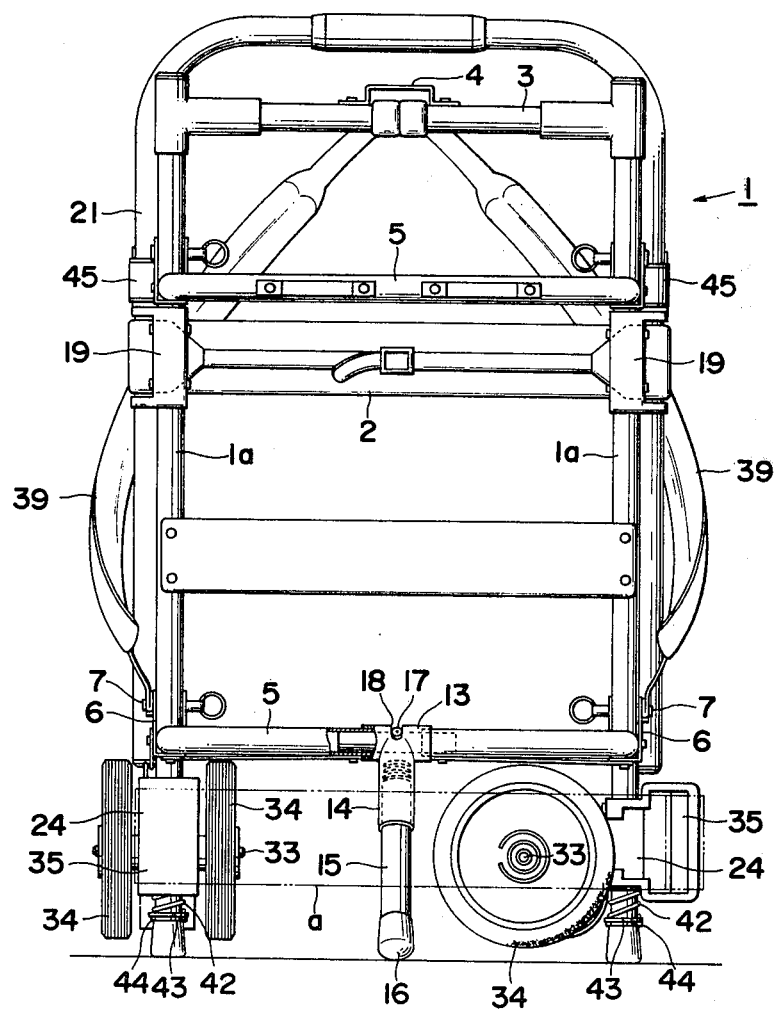
FIG. 8 is the front view of the shoulder-carriable cart as illustrated in FIG. 7.

The other embodiment of the present invention will now be explained with reference to FIGS. 7 and 8.

In this embodiment, shelfs 5 are mounted on the metal pipe 1a at the upper and lower portions thereof. The leg 15 of the lower shelf 5 is normally urged outwardly by a coil spring 41 so that it does not move inwardly inadvertently.

The lower end of each of the wheel supports 24 is held by a coil spring 42 arranged on the lower portion of each metal pipe 1a, which in turn is supported through a washer 43 by a supporting pin 44 projected from the metal pipe 1a.

The lower end of the shoulder strap 39 is connected to the pin 7 for supporting the lower shelf 5.

The length of the extension pipe 21 can be controlled by adjusting fastening members 45 mounted on the connectors 19, respectively.

The function of this embodiment will now be explained.

When each of the wheel supports 24 is to be rotated, the upper end of the wheel support 24 is disengaged from the pin 28 by depressing against the coil spring 42 the wheel support 24, and the wheel support 24 is rotated through 90 or 180 degrees in the desired direction. Then, the depressed wheel support 24 is released, so that the pin 28 is engaged again with the groove 27 on the upper end of the wheel support 24 by means of the coil spring 42. Accordingly, the wheel support 24 can be fixed to the rotated position.

In this embodiment, the shoulder strap 39 is not fixed to the wheel support 24, the shoulder strap 39 does not disturb the rotation of the wheel support 24.

Further, in this embodiment, the change of direction of the wheel support 24, that is, the wheel 34 can be done easily, because the wheel support can be rotated while merely depressing it against the coil spring 42.

The other constructions and functions of the shoulder-carriable cart in this embodiment are the same with that in the first embodiment, so that the detailed description thereof is omitted.

What is claimed is:

1. A shoulder-carriable cart comprising: a frame including a pair of pipes; a pair of wheel supports fitted over the lower portions of the frame in such a manner that they can be rotated or held immovable; wheels, each mounted on and projecting from one side of a wheel support, pins projecting from the frame; grooves formed in the wheel supports to receive the pins to selectively hold the wheels immovable on the front side of the frame, the back side of the frame, and between the pipes of the frame, and a buckle through which a waist belt is inserted attached to each wheel support on the side thereof opposite the side on which an associated wheel is mounted.

2. A shoulder-carriable cart comprising a frame including a pair of pipes, a pair of wheel supports mounted on said frame for rotational movement relative thereto, wheels, each of said wheels mounted on and projecting from one side of an associated wheel support, means for releasably retaining said wheel supports relative to said frame in a first position wherein said wheels are disposed on the front side of said frame, in a second position wherein said wheels are disposed on the back side of said frame and in a third position wherein said wheels are disposed between said pair of pipes, and a buckle through which a waist belt is inserted attached to each wheel support on the side thereof opposite the side on which an associated wheel is mounted.

3. A shoulder-carrier cart as set forth in claim 2 wherein said retaining means comprises pins projecting from said frame and grooves in said wheel supports receiving said pins therein.

4. A shoulder-carrier cart as set forth in claim 3 wherein retaining means further includes springs biasing said wheel supports toward engagement with said pins.

5. A shoulder-carrier cart as set forth in claim 3 wherein said retaining means further includes threads on said pipes and nuts engaged with said threads for maintaining said wheel supports in engagement with said pins.

6. A shoulder-carrier cart as set forth in claim 2 wherein said frame has a movable leg and spring means for releasably retaining said leg in a fixed position on said frame.

7. A shoulder-carriable cart comprising a frame including a pair of pipes, a pair of wheel supports mounted on said frame for rotational movement relative thereto, wheels, each of said wheels mounted on and projecting from one side of an associated wheel support, means for releasably retaining said wheel supports relative to said frame in a first position wherein said wheels are disposed on the front side of said frame, in a second position wherein said wheels are disposed on the back side of said frame and in a third position wherein said wheels are disposed between said pair of pipes, a movable leg mounted on said frame, and means for releasably retaining said leg in fixed position on said frame.

8. A shoulder-carriable cart as set forth in claim 7 wherein said means for releasably retaining said leg comprises a spring.

9. A shoulder-carriable cart as set forth in claim 7 wherein said frame includes a shelf supported on said pipes for movement between retracted and extended positions and means for releasably retaining said shelf in its extended position.

10. A shoulder-carriable cart as set forth in claim 9 wherein said leg is movably mounted on said shelf.

* * * * *